United States Patent
Shimamura

(10) Patent No.: US 9,692,936 B2
(45) Date of Patent: Jun. 27, 2017

(54) IMAGE PROCESSING APPARATUS AND IMAGE PROCESSING METHOD FOR CLIPPING, FROM A SECOND IMAGE, AN AREA AT A POSITION CORRESPONDING TO DESIGNATED POSITION IN A FIRST IMAGE

(71) Applicant: CANON KABUSHIKI KAISHA, Tokyo (JP)

(72) Inventor: Koya Shimamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/082,894

(22) Filed: Mar. 28, 2016

(65) Prior Publication Data

US 2016/0301827 A1    Oct. 13, 2016

(30) Foreign Application Priority Data

Apr. 9, 2015    (JP) ................................. 2015-080441

(51) Int. Cl.
*H04N 1/387*    (2006.01)
*H04N 1/00*    (2006.01)

(52) U.S. Cl.
CPC ....... *H04N 1/3873* (2013.01); *H04N 1/00411* (2013.01); *H04N 1/00466* (2013.01); *H04N 1/00795* (2013.01); *H04N 2201/0094* (2013.01)

(58) Field of Classification Search
None
See application file for complete search history.

(56) References Cited

U.S. PATENT DOCUMENTS

2007/0211295 A1*  9/2007  Hosoi ................... H04N 1/387
                                                                    358/1.18

FOREIGN PATENT DOCUMENTS

JP          11-203491 A      7/1999
WO     WO 2013094901 A1 *  6/2013  ......... G06F 3/04845

* cited by examiner

*Primary Examiner* — Thomas D Lee
(74) *Attorney, Agent, or Firm* — Canon U.S.A., Inc. IP Division

(57) ABSTRACT

An aspect of the present invention provides an image processing apparatus that includes a reading unit configured to read a plurality of documents, a display control unit configured to display on a screen a first image corresponding to a first document among the plurality of documents read by the reading unit, a receiving unit configured to receive a position serving as an area starting point for of a designated area in the first image, and a specifying unit configured, according to the position serving as the area starting point received by the receiving unit, to specify an area of a second image corresponding to a second document read by the reading unit, wherein the display control unit displays on the screen, along with the first image, the area of the second image specified by the specifying unit.

8 Claims, 16 Drawing Sheets

FIG.6

Application Form

Application Information

Full Name          Address
Last       First

Phone

FIG.7A

Application Form

Application Information

Full Name          Address
Last      First

Yakou   Taro    Kanagawa

500

Phone
01-XXXX-YYYY

FIG.7B

Application Form

Application Information

Full Name          Address
Last      First

Kosugi   Hanako   Tokyo

501

Phone
02-YYYY-ZZZZ

FIG.7C

Application Form

Application Information

Full Name          Address
Last      First

Toride   Keiko    Ibaragi

502

Phone
03-AAAA-XXXX

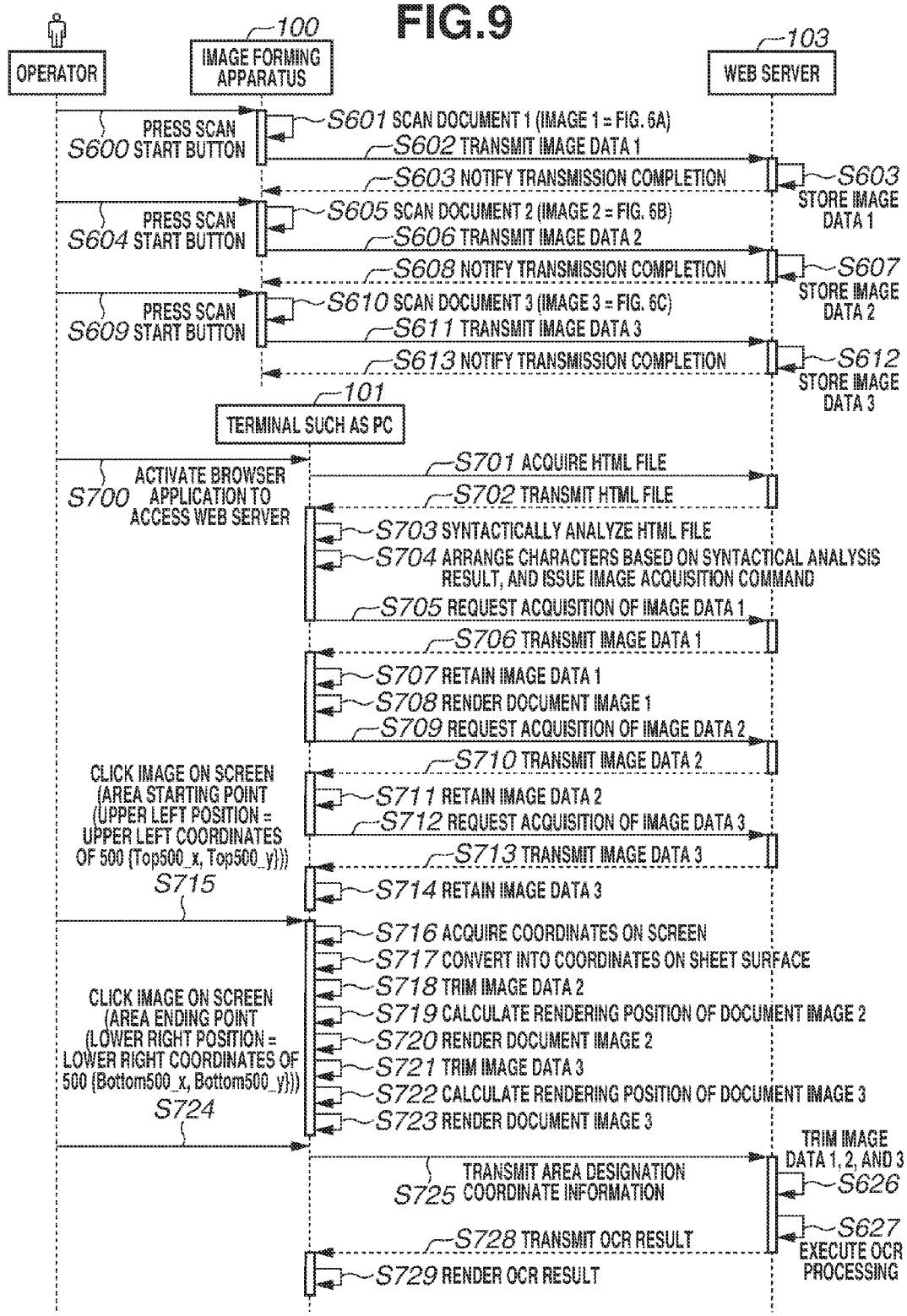

FIG.10A

Application Form

Application Information

Full Name          Address
Last      First       {Top500_x, Top500_y}
Yakou  Taro    Kanagawa
              500
Phone
01-XXXX-YYYY

FIG.10B

Application Form

Application Information

Full Name          Address
Last      First    500
Yakou  Taro    Kanagawa
       Hanako  501
       Keiko   502
Phone
01-XXXX-YYYY

FIG.10C

Application Form

Application Information

Full Name          Address
Last      First        {Bottom500_x, Bottom500_y}
Yakou  Taro B C Kanagawa
500    Hanako  501
       Keiko   502
Phone
01-XXXX-YYYY

FIG.11

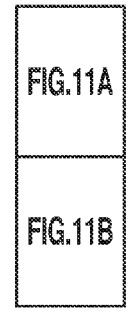

FIG.11A

```
001  <script>
002
003     //DECLARE CANVAS
004     var canvas = document.getElementById('canvas1');
005     var ctx = canvas1.getContext('2d');
006
007     //CREATE IMAGE OBJECT OF IMAGE DATA 1 AND DESIGNATE PATH
008     var dataImg1 = new Image();
009     dataImg1.src = "./IMAGE DATA 1.jpg";
010
011     //PROCESSING TO BE EXECUTED AFTER COMPLETION OF READING IMAGE DATA 1
012     dataImg1.onload = function(){
013
014       //RENDER DOCUMENT IMAGE 1, DISPLAY IN SIZE OF (x1, y1) = (500, 600) ON SCREEN
015       var disp_x = 500;
016       var disp_y = 600;
017       ctx.drawImage(dataImg1, 0, 0, disp_x, disp_y);
018
019       //CREATE IMAGE OBJECT OF IMAGE DATA 2 AND DESIGNATE PATH
020       var dataImg2 = new Image();
021       dataImg2.src = "./IMAGE DATA 2.jpg";
022
023       //CREATE IMAGE OBJECT OF IMAGE DATA 3 AND DESIGNATE PATH
024       var dataImg3 = new Image();
025       dataImg3.src = "./IMAGE DATA 3.jpg";
026
027       //FLAG FOR DETERMINING WHETHER MOUSE IS CLICKED ONE TIME
028       var flag = 0;
029
030       //PROCESSING TO BE EXECUTED WHEN CLICKING (WHEN DESIGNATING AREA STARTING POINT)
031       document.getElementById("target").onclick = function(e){
032
033         //ACQUIRE CLICKED COORDINATES ON SCREEN
034         mouseX = e.pageX;
035         mouseY = e.pageY;
036
```

FIG.11B

```
037    //RATE USED TO ADJUST POSITION ON SCREEN AND POSITION ON SHEET SURFACE
038    var scan_x = 2480;
039    var scan_y = 3507;
040    var kamiX = scan_x/disp_x;
041    var kamiY = scan_y/disp_y;
042
043    //WHETHER MOUSE IS CLICKED ONE TIME, ODD-NUMBER OF TIMES = UPPER LEFT, EVEN-NUMBER OF TIMES = LOWER RIGHT
044    if(flag == 0){
045
046      Top_X1f = mouseX*kamiX;//ACTUAL IMAGE SIZE CALCULATION
047      Top_Y1f = mouseY*kamiY;//ACTUAL IMAGE SIZE CALCULATION
048       Top_X1 = mouseX;   //BROWSER DISPLAY POSITION
049       Top_Y1 = mouseY;   //BROWSER DISPLAY POSITION
050
051       //RENDER DOCUMENT IMAGE 2, DOCUMENT IMAGE 3
052       ctx.drawImage(dataImg2, Top_X1, Top_Y1, Width1, Height1, Top_X1, Top_Y1+Height1+50, Width1, Height1);
053       ctx.drawImage(dataImg3, Top_X1, Top_Y1, Width1, Height1, Top_X1, Top_Y1+Height1*2+50, Width1, Height1);
054
055       flag++;
056
057    }else{
058
059      Bottom_X1f = mouseX*kamiX;//ACTUAL IMAGE SIZE CALCULATION
060      Bottom_Y1f = mouseY*kamiY;//ACTUAL IMAGE SIZE CALCULATION
061       Bottom_X1 = mouseX;      //BROWSER DISPLAY POSITION
062       Bottom_Y1 = mouseY;      //BROWSER DISPLAY POSITION
063
064       flag--;
065
066      }
067     }
068    }
069
070  </script>
```

FIG.12A

Application Form

Application Information

Full Name          Address
Last     First

Yakou    Taro      Kanagawa

Phone
01-XXXX-YYYY

FIG.12B

Application Form

Application Information

Full Name          Address
Last     First

Yakou    Taro      Kanagawa

Phone
01-XXXX-YYYY

FIG.12C

Application Form

Application Information

Full Name          Address
Last     First

Yakou    Taro      Kanagawa

Phone
01-XXXX-YYYY

FIG.12D

Application Form

Application Information

Full Name          Address
Last     First

Yakou    Taro      Kanagawa

Phone
01-XXXX-YYYY

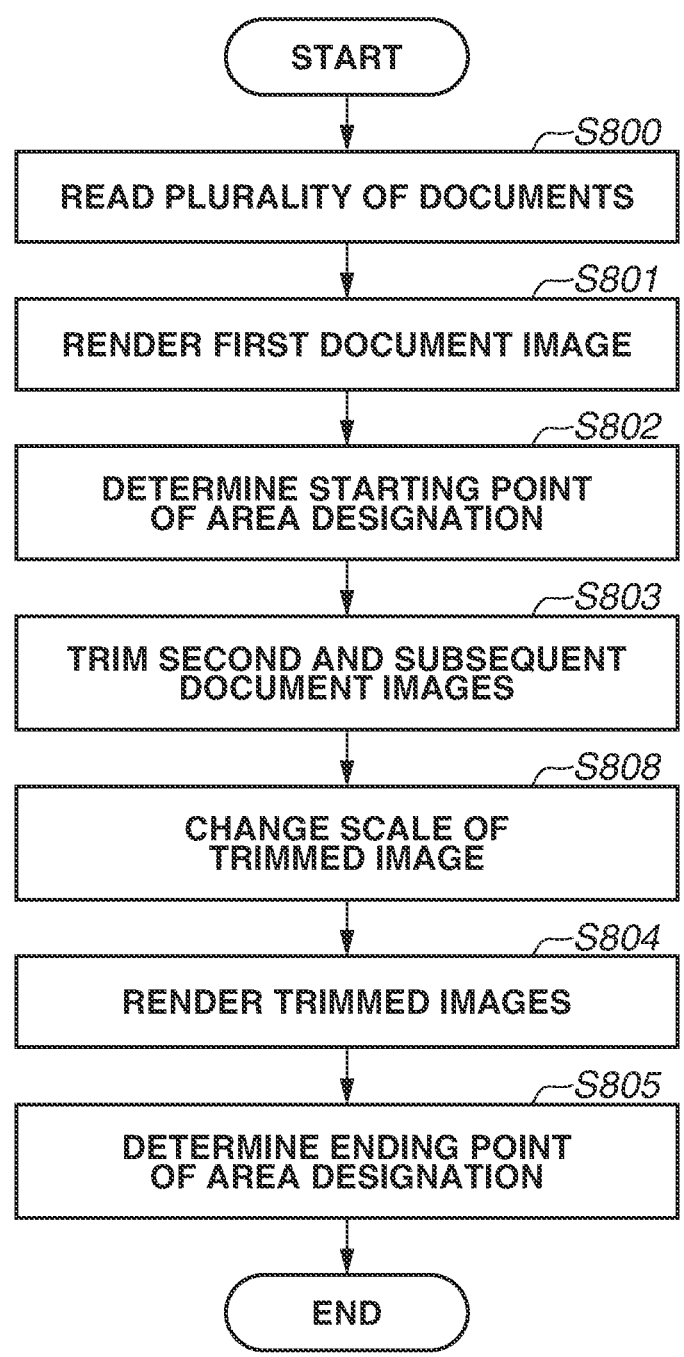

IMAGE PROCESSING APPARATUS AND IMAGE PROCESSING METHOD FOR CLIPPING, FROM A SECOND IMAGE, AN AREA AT A POSITION CORRESPONDING TO DESIGNATED POSITION IN A FIRST IMAGE

BACKGROUND OF THE INVENTION

Field of the Invention

The present invention relates to an image processing apparatus capable of clipping out an object written in a digitized document and to an image processing method.

Description of the Related Art

There are mainly two methods for extracting a desired area from a document to digitize the desired area.

In the first method, an operator designates a desired area to be extracted from an input image on each occasion which is acquired by reading a document by a scanner.

For example, the document is read by the scanner, and the resultant input image is displayed on a display. Then, the operator designates a desired area from the displayed input image using, for example, a mouse.

In the second method, the operator creates in advance a template for defining position information of a rectangle, so that a rectangular area defined by the template is applied to an input image as it is and then extracted. In this case, the rectangular area with a position and size that are defined by the template is extracted from the input image. This saves an operator from having to designate an extraction area one by one.

In the first method in which the operator designates the desired area in the input image, or the second method in which the operator creates the template in which the position information about the rectangle is defined, the operator can determine an area to be extracted. That is, only one area within a designated block in an input image can be selected in a pinpoint manner.

In the first method, however, the operator needs to designate a desired area on each occasion. The operator has to designate each of desired areas from input images acquired by reading many documents. In such a case, designating the desired areas is time consuming.

In the second method using the template, a desired area to be extracted from the input image and an area that is set in the template may differ in position or size. In such a case, an area in which the desired area is chipped off may be extracted.

For example, a length of text written in a desired area to be extracted may differ depending on document, and a desired area to be extracted may be designated narrower due to insufficient length of text used when a template is created. In such a case, an area in which the desired area is missing is extracted from the input image.

Japanese Patent Application Laid-Open No. 11-203491 discusses a method for solving such a problem of extracting an area in which a desired area is chipped off in a case where the desired area to be extracted and an area that is set in a template differ in position or size. First, a position, size, and attribute regarding an area about an input image are retained as template information. Next, a scanner reads a document to acquire an input image, and block areas are extracted from the input image to determine attributes or the respective extracted block areas. Among the extracted block areas, a block area including at least one portion that overlaps with an area indicated by the template information, and coincides with an attribute that is set in the template information is extracted. Such processing eliminates the problem of extracting an area in which a desired area is chipped off even if the desired area is designated narrower than the area designated in the template.

However, since the method discussed in Japanese Patent Application Laid-Open No. 11-203491 is dependent on the block area extraction processing, determination of the area is affected by a designated block recognition result. For example, in a case where only a character block arranged in the middle among three character blocks arranged side by side needs to be selected in a pinpoint manner, all of the three character blocks may be selected due to the block area extraction processing. Consequently, when the operator needs to select only one area within a desired designated block, pinpoint selection of one area is difficult.

SUMMARY OF THE INVENTION

According to an aspect of the present invention, an image processing apparatus includes a reading unit configured to read a plurality of documents, a display control unit configured to display on a screen a first image corresponding to a first document among the plurality of documents read by the reading unit, a receiving unit configured to receive a position serving as an area starting point of a designated area in the first image, and a specifying unit configured, according to the position serving as the area starting point received by the receiving unit, to specify an area of a second image corresponding to a second document read by the reading unit, wherein the display control unit displays on the screen, along with the first image, the area of the second image specified by the specifying unit.

According to another aspect of the present invention, designation of areas can be performed by extracting data from a plurality of documents, for example, using a template, which may save time for a user. Moreover, even if desired areas include objects of different size, a designation area can be determined in consideration of size of each object.

Further features of the present invention will become apparent from the following description of exemplary embodiments with reference to the attached drawings.

BRIEF DESCRIPTION OF THE DRAWINGS

FIG. 6 is a diagram illustrating an example of a document.

FIGS. 7A, 7B, and 7C are diagrams each illustrating an example of a document.

FIG. 9 is a sequence diagram illustrating processing executed in the first exemplary embodiment.

FIGS. 10A, 10B, and 10C are diagrams illustrating area determination.

FIG. 11, comprising FIGS. 11A and 11B, is a diagram illustrating an example of a program executed in the first exemplary embodiment.

FIGS. 12A, 12B, 12C, and 12D are diagrams illustrating examples of possible positional shifts of an image, which may occur in a second exemplary embodiment of the present invention.

FIG. 15 is a flowchart illustrating processing executed according to a fourth exemplary embodiment of the present invention.

DESCRIPTION OF THE EMBODIMENTS

Various exemplary embodiments, features, and aspects of the present invention will be described in detail below with reference to the drawings. However, components described in the exemplary embodiments are merely examples, and the scope of the present invention is not limited to the following exemplary embodiments.

<System Configuration>

Figure 1:
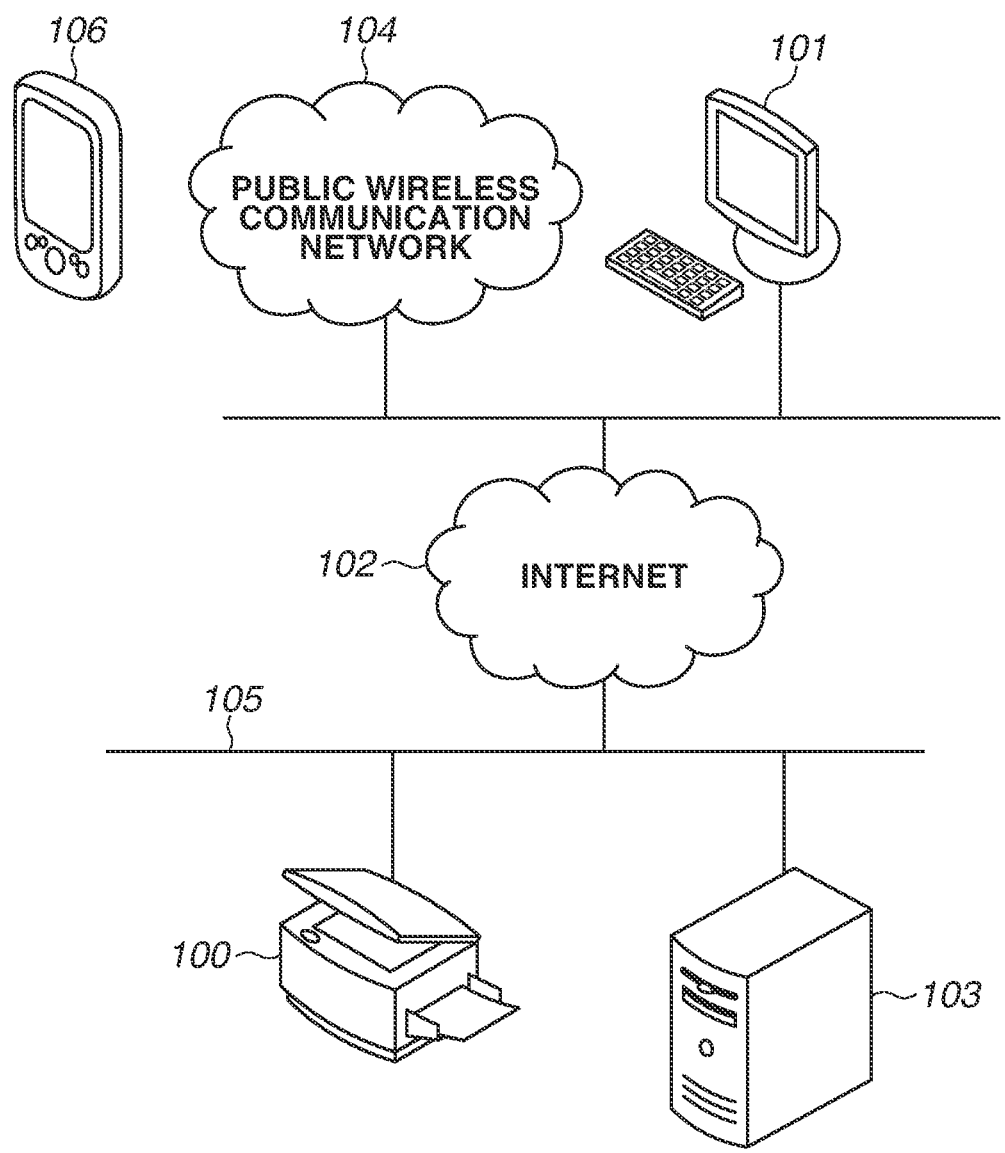
FIG. 1 is a diagram illustrating an overall configuration of a system.

FIG. 1 is a diagram illustrating an overall configuration of a system to which a first exemplary embodiment of the present invention can be applied.

As illustrated in FIG. 1, an image forming apparatus (an image processing apparatus) 100, a terminal 101 such as a personal computer (PC), and a web server 103 are connected to a local area network (LAN) 105 constituted by Ethernet (trademark) a wireless LAN and then connected to the Internet 102. Moreover, a mobile terminal 106 is connected to the Internet 102 via a network such as a public wireless communication network 104. The image forming apparatus 100, the terminal 101 such as the PC, the web server 103, and the mobile terminal 106 are connected to the Internet 102 via the LAN 105 or the public wireless communication network 104 so as to be mutually communicable. The system illustrated in FIG. 1 includes the mobile terminal 106 and the terminal 101 such as the PC. However, the system may include one of the mobile terminal 106 and the terminal 101 such as the PC.

The image forming apparatus 100 serves as a multifunctional peripheral including an operation unit, a scanner unit, and a printer unit. In the system according to the present exemplary embodiment, the image forming apparatus 100 is used as a scanner terminal that scans a plurality of paper documents.

The web server 103 is used as a web server terminal. In the web server 103, a text file such as a hypertext markup language (HTML) file for describing a document on the web is stored. The text file is needed for the web server 103 to function as the web server terminal. Moreover, the web server 103 can be used as a file server for storing an image transmitted from the image forming apparatus 100, and as an image processing server for performing image processing. In the system according to the present exemplary embodiment, the web server 103 is used as the web server, the file server, and the image processing server.

The terminal 101 such as the PC displays a web page via a web browser by using a web language such as an HTML language stored in the web server 103. Moreover, the terminal 101 includes an input unit and a designation unit, and an operation can be performed from a web page. In the system according to the present exemplary embodiment, the terminal 101 is used as a display terminal and an operation terminal. Moreover, the mobile terminal 106 is a smart phone or a tablet terminal including an operation unit, a wireless communication unit, and an application unit for operating a web browser. In the system according to the present exemplary embodiment, the mobile terminal 106 can be used as a display terminal and an operation terminal similar to the terminal 101 such as the PC. Since each of the mobile terminal 106 and the terminal 101 such as the PC redundantly has a function of operating the web browser, either the terminal 101 or the mobile terminal 106, or both of the terminal 101 and the mobile terminal 106 may be used.

Such configurations are only illustrative, and not all of the configurations are necessarily required. For example, if a scan function of reading a document, a function of storing an image, a web server function, and display/operation using a browser application can be executed inside the image forming apparatus 100, a relevant system can be constituted only by the image forming apparatus 100. Moreover, the image forming apparatus 100 can include inside a function of reading a document, a function of storing an image, a web server function, and an image processing server function, and the terminal 101 such as the PC can display/operate, for example, information, using a browser application. Moreover, the web server function and the display/operation using the browser application are not limited to a web-based web application. For example, the web server function and the display/operation using the browser application can be performed using a stand-alone application that operates on a local desktop environment.

<Hardware Configuration of Image Forming Apparatus 100>

Figure 2:
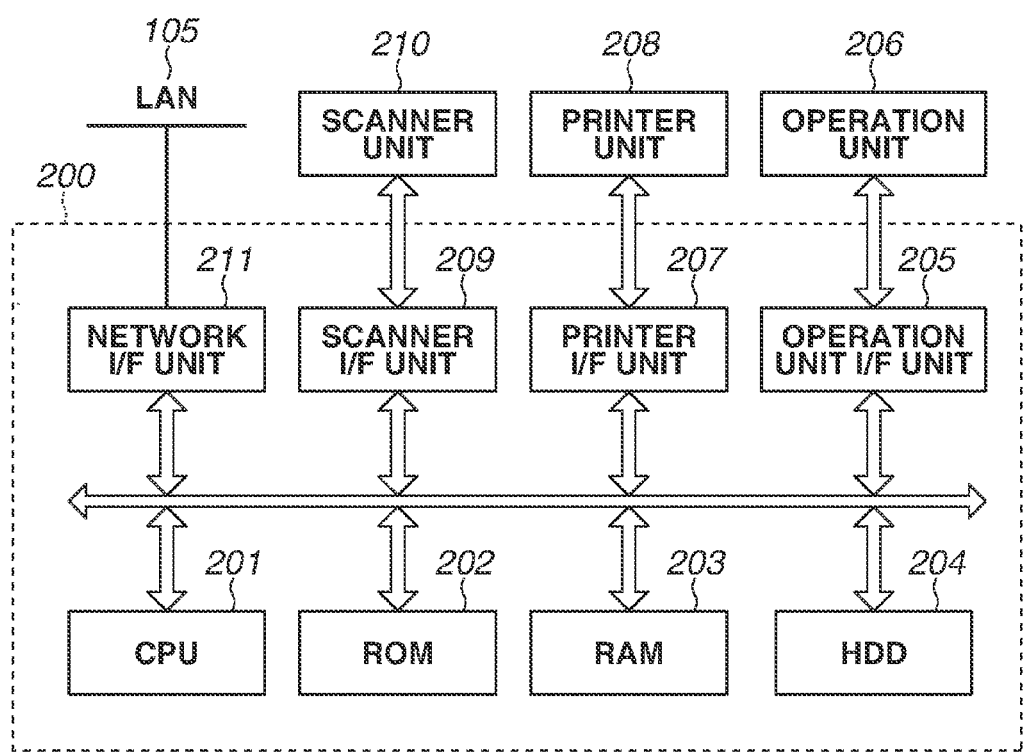
FIG. 2 is a diagram illustrating a hardware configuration of an image forming apparatus.

FIG. 2 is a block diagram illustrating a configuration of the image forming apparatus 100. A control unit 200 includes a central processing unit (CPU) 201, a read only memory (ROM) 202, a random access memory (RAM) 203, a hard disk drive (HDD) 204, a network interface (I/F) unit 211, a scanner I/F unit 209, a printer I/F unit 207, and an operation unit I/F unit 205 that are communicably connected to one another via a system bus. The control unit 200 controls the entire operations of the image forming apparatus 100.

The CPU 201 reads a control program stored in the ROM 202 to perform various controls such as a reading control and a transmission control.

The RAM 203 is used as a main memory and a temporary storage area such as a work area of the CPU 201.

The HDD 204 stores image data, various programs, or various information tables. The operation unit I/F unit 205 connects an operation unit 206 and the control unit 200. The operation unit 206 includes a keyboard or a liquid crystal display unit having a touch panel function.

The printer I/F unit 207 connects a printer unit 208 and the control unit 200. The control unit 200 transfers image data to be printed to the printer unit 208 via the printer I/F unit 207, and the printer unit 208 prints the image data on a recording medium.

The scanner I/F unit 209 connects a scanner unit 210 and the control unit 200. The scanner unit 210 reads an image on a document to generate image data, and inputs the image data to the control unit 200 via the scanner I/F unit 209.

The network I/F unit 211 connects the control unit 200 (the image forming apparatus 100) to the LAN 105. The network I/F unit 211 transmits Image data to an external device (the web server 103 in the present exemplary embodiment) on the LAN 105, and receives various information from the external device on the LAN 105.

<Hardware Configuration of Web Server 103>

Figure 3:
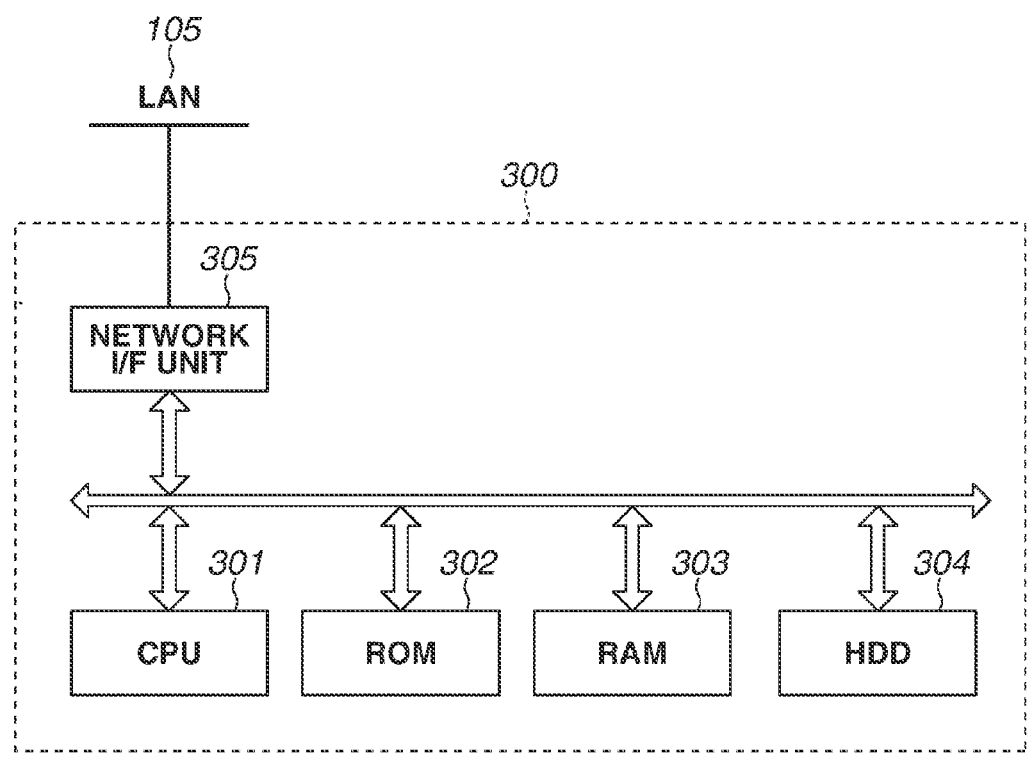
FIG. 3 is a diagram illustrating a hardware configuration of a web server.

FIG. 3 is a block diagram illustrating a configuration of the web server 103. A control unit 300 includes a CPU 301, a ROM 302, a RAM 303, an HDD 304, and a network I/F unit 305 that are communicably connected to one another via a system bus. The control unit 300 controls the entire operations of the web server 103. The CPU 301 reads a control program stored in the ROM 302 to execute various control processing. The RAM 303 is used as a main memory and a temporary storage area such as a work area of the CPU 301. The HDD 304 receives image data scanned by the image forming apparatus 100 to store such data. In addition to the image data, the HDD 304 stores a text file, such as a HTML file for describing a document on the web. Particularly, for example, the HDD 304 stores a text file written in an HTML language or a style sheet language (e.g., cascading style sheets (CSS) language) for determining a page style thereof. Moreover, the HDD 304 stores a text file written in a hypertext preprocessor (PHP) language or JavaScript (trademark) which is a programming language for dynamic web page and web application.

The network I/F unit 305 connects the control unit 300 (the web server 103) to the LPN 105. The network I/F unit 305 transmits and receives various information to and from other devices on the LAN 105.

<Hardware Configuration of Mobile Terminal 106 and Terminal 101 such as PC>

Figure 4:
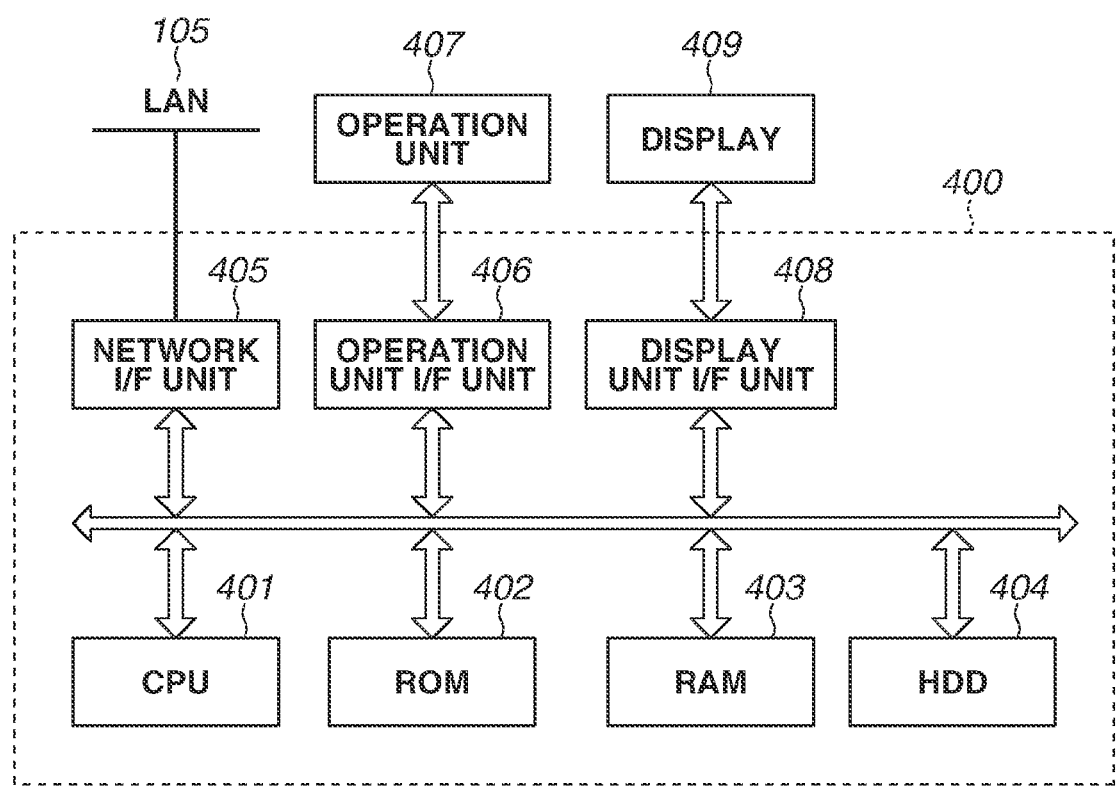
FIG. 4 is a diagram illustrating a hardware configuration of a terminal such as a personal computer (PC).

FIG. 4 is a block diagram illustrating a configuration of the mobile terminal 106 and the terminal 101 such as a PC. In the present exemplary embodiment, since the mobile terminal 106 and the terminal 101 such as the PC provide substantially the same functions, the description thereof is given collectively.

In FIG. 4, a control unit 400 includes a CPU 401, a ROM 402, a PAM 403, an HDD 404, a network I/F unit 405, an operation unit I/F unit 406, and a display unit I/F unit 408 that are communicably connected to one another via a system bus. The control unit 400 including the CPU 401 controls the entire operations of the mobile terminal 106 and the terminal 101 such as the PC. The CPU 401 reads a control program stored in the ROM 402 to execute various control processing. The RAM 403 is used as a main memory and a temporary storage area such as a work area of the CPU 401. In the HDD 404, a browser application (application software such as a web application used via a network) is installed.

The network I/F unit 405 connects the control unit 400 (the mobile terminal 106 or the terminal 101 such as the PC) to the LAN 105. The network I/F 405 transmits and receives various information to and from other devices on the LAN 105. If the mobile terminal 106 is used, the mobile terminal 106 can be connected to the Internet 102 via a wireless LAN such as wireless fidelity (Wi-Fi), instead of the LAN 105.

The operation unit I/F unit 406 connects an operation unit 407 and the control unit 400. Upon receipt of an instruction from an operator, the operation unit 407 inputs the instruction to the control unit 400 via the operation unit I/F unit 406.

The display unit I/F unit 408 connects a display 409 and the control unit 400. The display 409 displays operation information for the operator.

<Sequence>

A description is provided of an example of processing performed when an area of characters written in substantially the same location on each of a plurality of documents with the common standard format is designated as an optical character recognition (OCR) area.

Since each of the documents does not necessarily have the same characters, a character area of each document can have different size (length). That is, a length of the character area is variable.

Figure 5:
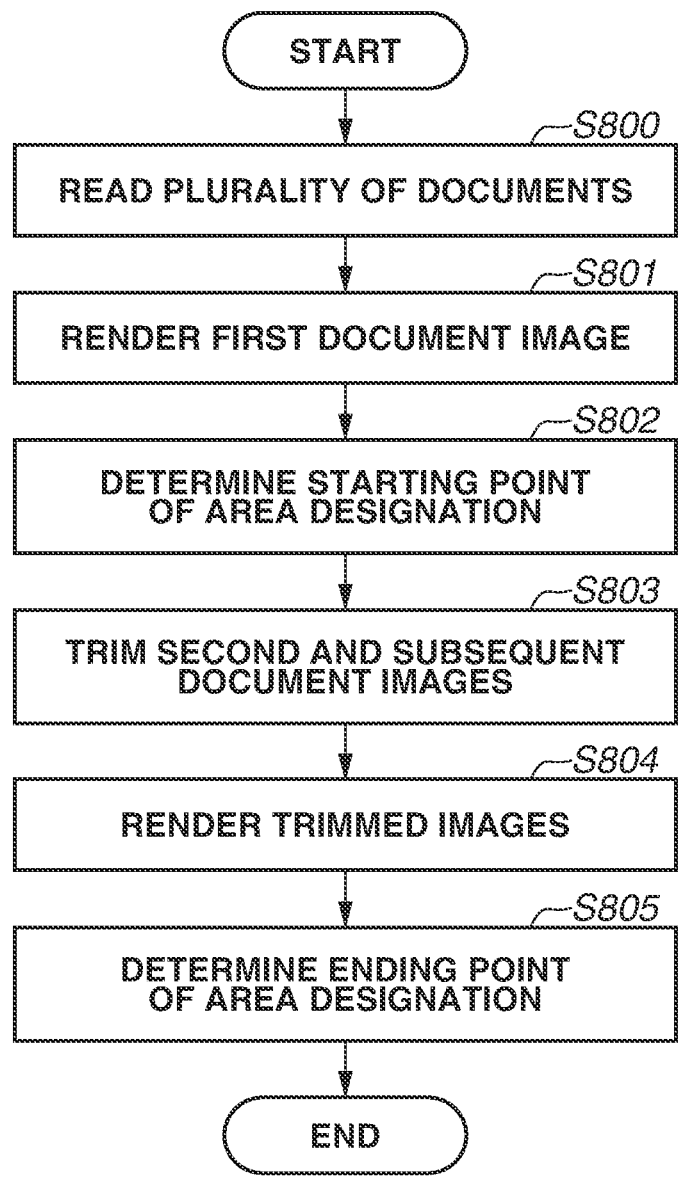
FIG. 5 is a flowchart illustrating overall processing performed according to a first exemplary embodiment of the present invention.

The processing of the flowchart illustrated in FIG. 5 is executed when an area of characters written in substantially the same location is designated as a designated area. In the processing, auxiliary information necessary for determination of an area to be designated is displayed for the operator so that a most appropriate area is determined.

An overall procedure performed to designate the area in substantially the same location on each of documents with the standard format is described with reference to FIG. 5. Herein, the overall procedure is described. A detailed description of the procedure will be provided below.

In step S800, the image forming apparatus 100 reads a plurality of standard format documents. The term "standard format document" used herein will be described below using an example.

In step S801, a document image is created using image data of a first document that has been read first from among the plurality of standard format documents read in step S800, and the created document image is displayed on a screen. That is, the first document image is rendered. An area to be used for clipping processing is determined based on such a document image.

In step S802, a starting point of an area in which clipping processing is performed on a document image is determined based on the image data of the first document displayed on the screen. If a rectangular area is clipped, the starting point of the clipping is set to an upper left pixel of the rectangular area.

In step S803, document images of second and subsequent documents, which were not rendered in step S801, are trimmed based on the starting point determined in step S802.

Each of steps S804 and S805 described below is characteristic processing of the present exemplary embodiment.

In step S804, the second and subsequent document images trimmed in step S803 are rendered.

In step S805, the document image corresponding to the first-read document and the document images acquired by trimming the second and subsequent document images are displayed on the screen. Based on the trimming result of the displayed document images, an ending point position of the area to undergo the clipping processing is determined.

When such a procedure is performed to clip a specific area of each of the documents with the standard format, reference information needed for the operator to designate an appropriate area can be displayed via the screen. More specifically, a control operation is performed such that the areas of other documents in positions corresponding to the position designated with respect to the certain document can be displayed side by side on the screen as reference information. This enables the operator to designate the area in consideration of an area size of the other documents.

An area of characters written in substantially the same location of each of documents with the standard format is designated as an OCR area. Such a case is described with respect to FIGS. 6 through 8.

FIG. 6 is a diagram illustrating a standard-format document. The standard-format document is an application or request form, a receipt, and a registration certificate which have a standard format.

Figure 8A:
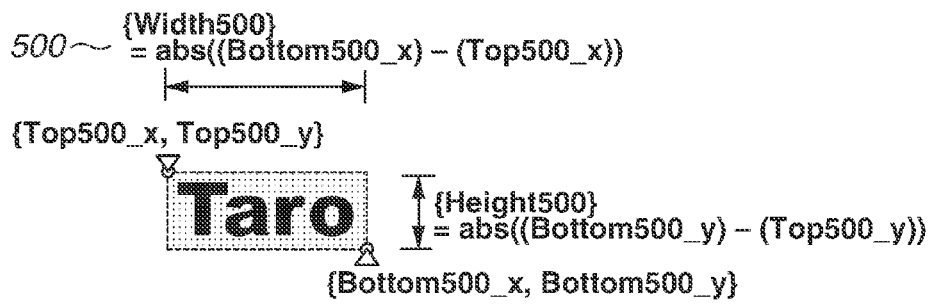
FIGS. 8A, 8B, and 8C are diagrams each illustrating an example of a document in detail.
Figure 8B:
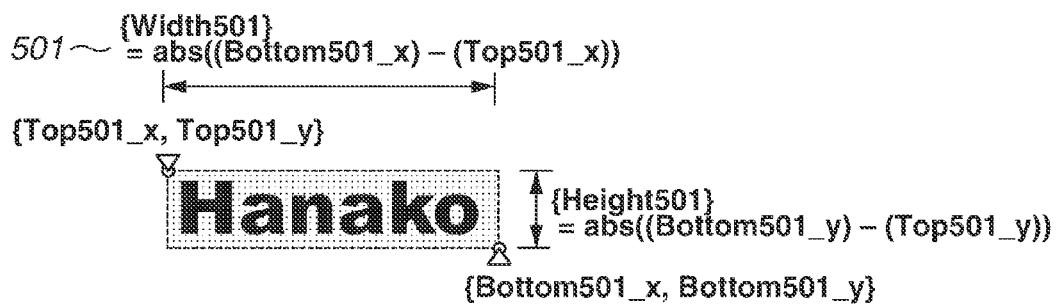
Figure 8C:
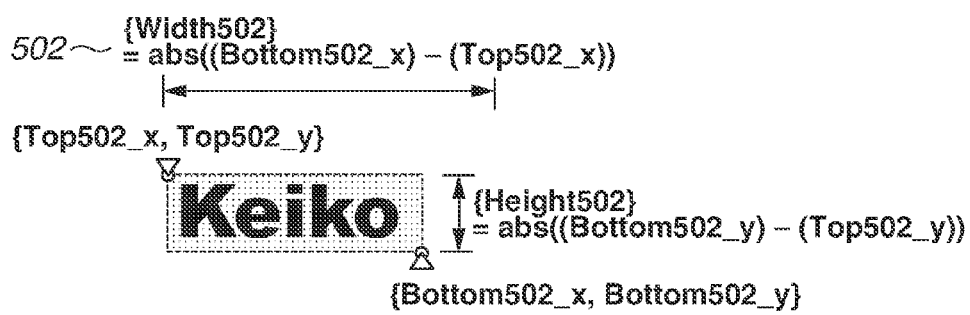

Each of FIGS. 7A, 7B, and 7C illustrates an example of a document in which boldface characters are written in certain areas (gray hatching portions indicated by broken-lines) with respect to the standard format illustrated in FIG. 6. For example, in FIGS. 7A, 7B, and 7C, coordinates of areas 500, 501, and 502 in which the characters are written are respectively designated. When the characters written in the areas 500, 501, and 502 are extracted, values as illustrated in FIG. 8 are acquired. For example, when the area 500 is extracted, upper-left coordinates {Top500_x, Top500_y} and lower-right coordinates {Bottom500_x, Bottom500_y} illustrated in FIG. 8A are acquired. Alternatively, upper-left coordinates {Top500_x, Top500_y}, a width {Width500} from the upper-left coordinates of a starting point, and a height {Height500} may be acquired. Assume that coordinates described in the exemplary embodiment are acquired when upper left coordinates of image data is set as a starting point. Similar to the area 500, coordinates of the areas 501 and 502 respectively illustrated in FIGS. 8B and 8C are acquired. That is, coordinates {Top501_x, Top501_y} and {Bottom501_x, Bottom501_y} for the area 501, and coordinates {Top502_x, Top502_y} and {Bottom502_x, Bottom502_y} for the area 502 are acquired. In a case where the operator needs to designate coordinates with respect to each of the areas 500, 501, and 502, the number of designation operations increases markedly.

On the other hand, since the character are written in the substantially the same locations (the same coordinates) within the standard formats, coordinates can be determined based on only the area 500. However, application of the coordinates of the area 500 to the areas 501 and 502 may cause a length of characters to differ (a variable length) depending on the document. Consequently, in some cases, a value of the width {Width501} or {Width502} is greater than that of the width {Width500}. Hence, there is a possibility that the coordinates may be outside the area 501 or 502.

Accordingly, since the characters are written in the substantially the same locations (the same coordinates) within the standard formats, one location of one representative document (FIG. 7A and FIG. 8A in the present exemplary embodiment) can be used to determine coordinates. In such a case, corresponding locations of the other documents are displayed as reference information, and this procedure is illustrated in a sequence diagram of FIG. 9.

The sequence illustrated in FIG. 9 includes processing performed by the image forming apparatus 100, the web server 103, and the terminal 101 such as the PC. The processing is executed by an instruction from the operator.

Processing from steps S600 to S613 illustrates a scan operation performed by the image forming apparatus 100 and the web server 103 according to an instruction issued by the operator. In step S600, the operator issues an instruction for start of scanning to the image forming apparatus 100. Particularly, the operator presses a scan start button. The document illustrated in FIG. 7A is scanned herein, and this document is set as a document 1. In step S601, the image forming apparatus 100 scans the document 1. The data scanned herein is set as image data 1 that represents image data acquired by scanning the document illustrated in FIG. 7A. In step S602, the image forming apparatus 100 transmits the image data 1 scanned in step S601 to the web server 103. In step S603, the web server 103 stores the image data 1 transmitted from the image forming apparatus 100. Processing from steps S604 to S608 and processing from steps S609 through S613 are substantially similar to that from steps S600 to S603. When the processing from steps S604 to S608 is executed, the document illustrated in FIG. 7B (a document 2) is scanned and the resultant data is stored as image data 2 in the web server 103. When the processing from steps S609 to S613 is executed, the document illustrated in FIG. 7C (a document 3) is scanned and the resultant data is stored as image data 3 in the web server 103. This is the scan processing sequence performed by the image forming apparatus 100 and the web server 103 according to the instruction issued by the operator.

Next, a designation processing sequence is described. The designation processing sequence is performed by the web server 103 and the terminal 101 such as the PC to designate an OCR area according to an instruction issued by the operator.

Processing from steps S700 to S714 is performed with respect to the terminal 101 such as the PC to acquire an image to display a document image. In step S700, the operator instructs the terminal 101 such as the PC to activate a browser application to access a web server. In step S701, the terminal 101 such as the PC acquires a file such as a HTML file from the web server 103. In step S702, the web server 103 transmits the file such as the HTML file to the terminal 101 such as the PC. In step S703, the terminal 101 such as the PC uses the browser application to syntactically analyze the file such as the HTML file transmitted from the web server 103. In step S704, the terminal 101 such as the PC arranges characters according to a syntactic analysis result acquired by the browser application, and issues an image acquisition command with respect to the web server 103 based on the reference (hyperlink) written in the HTML. In step S705, the terminal 101 such as the PC requests acquisition of the image data 1 according to the command issued in step S704. In step S706, the web server 103 transmits the image data 1 to the terminal 101 such as the PC. In step S707, the terminal 101 such as the PC temporarily retains the image data 1. In step S708, the terminal 101 such as the PC arranges the retained image 1 on the screen according to the syntactic analysis result of step S704. That is, the document image 1 is rendered. Similar to the processing from steps S705 to S707, processing from steps S709 to S711 and processing from steps S712 to S714 is respectively performed on the image data 2 and the image data 3. At this point, the terminal 101 such as the PC simply retains the image data 2 and the image data 3 and does not render the image data 2 or the image data 3, although the image data 1 (the document image 1) is rendered in step S708.

Processing from steps S715 to S724 illustrates an operation performed when the operator designates an area with the terminal 101 such as the PC. In step S715, the operator uses an external device such as a mouse to click an area starting point within the document image 1 displayed on the screen, thereby designating coordinates with respect to the terminal 101 such as the PC. In step S716, the terminal 101 acquires coordinates on the screen, the coordinates having the area starting point designated by the operator. In step S717, the terminal 101 converts the acquired coordinates on the screen into coordinates, on a sheet surface. In step S718, the terminal 101 trims the image data 2 based on the coordinates converted in step S717. The trimming can be actually performed in image processing, or an area outside the designated area can be masked at the time of rendering processing with an HTML language or a JavaScript (trademark) language. The trimming processing will be described below. In step S719, a position of the image data 2 trimmed in step S718 to be pasted on the screen of the terminal 101 such as the PC is calculated. For example, the image data 2 is pasted at coordinates in a position shifted in a y-axis direction relative to the starting point coordinates ({Top500_x, Top500_y} illustrated in FIG. 8A) of the image data 1 designated in step S715.

More specifically, the image data 2 is arranged at {Top500_x, Top500_y+{Height500}+α}.

In step 3720, the image data 2 trimmed in step S718 is rendered on the screen based on the position calculated in step S719.

Processing from steps S721 to S723 similar to that from steps S718 to the S720 is performed on the image data 3. With these steps, the following images are rendered on the screen.

That is, the entire area of the document image 1 rendered using the image data 1 in step S708, the trimmed image of the document image 2 rendered using the image data 2 in step S720, and the trimmed image of the document image 3 rendered using the image data 3 in step S723 are rendered on the screen.

Processing from steps S725 to S729 is executed in an area designated by the operator. In step S725, the terminal 101 such as the PC transmits coordinate information about the area designation (the ending point determination processing) determined by the operator using the terminal 101 to the web server 103. In step S726, the web server 103 trims the image data 1, 2, and 3 stored therein based on the area designation coordinate information transmitted from the terminal 101 such as the PC. In step S727, the web server 103 executes OCR processing on each of the document images 1, 2, 3 according to the images trimmed in step S726. In step S728, the web server 103 transmits an OCR processing result acquired in step S727 to the terminal 101 such as the PC. In step S729, the terminal 101 such as the PC renders the received OCR result on the screen. Thus, the sequence of the present exemplary embodiment ends.

<Detailed Description of Screen Display at the Time of Area Designation>

A screen display at the time of area designation is described in more detail with reference to FIGS. 10A, 10B, and 10C, and FIG. 11. More particularly, FIG. 11 illustrates an example of a JavaScript (trademark) language used to issue a screen display instruction at the time of area designation.

The processing from steps S705 to S707 illustrated in FIG. 9 is described in the example program illustrated in FIG. 11 (rows 007 to 009), and image data illustrated in FIG. 10A acquired from the web server 103 is retained. When the retention of the image data is finished, that is, completion of step S707, processing described in the example program illustrated in FIG. 11 (rows 011 to 012) is executed. The processing in step S708 for rendering the document image 1 using the image data 1 is described in the example program illustrated in FIG. 11 (rows 014 to 017). The image data illustrated in FIG. 10A is rendered on the screen in step S708. Herein, the example program illustrated in FIG. 11 (rows 015 and 016) indicates size to be applied when the image data displayed on the screen. Size of the document actually scanned is resized by the browser application, and the resized image data is displayed on the screen. The processing from steps S709 to S711 for retaining the image data 2 which is a scan result of the document 2 (FIG. 7B) is described in the example program illustrated in FIG. 11 (rows 019 to 021). Moreover, the processing from steps S712 to S714 for retaining the image data 3 which is a scan result of the document 3 (FIG. 7C) is described in the example program illustrated in FIG. 11 (rows 023 to 025). The processing in step S715 in which the operator designates an area starting point with respect to the terminal 101 such as the PC is described in FIG. 11 (rows 030 and 031). The operator designates a point A (indicated by an inverted triangle mark) in FIG. 10A rendered on the screen. When the operator designates a point on the screen in step S715, the processing for acquiring the coordinates on the screen in step S716 is executed to acquire coordinates of the point A {Top500_x, Top500_}. In FIG. 11 (rows 033 to 035), the coordinates on the screen are acquired as the processing in step S716. As for the conversion of the coordinates on the screen into the coordinates on the sheet surface in step S717, when the document image 1 is rendered in step S708, the processing in FIG. 11 (rows 015 and 016) is performed to resize the document image 1 to a size that is applied when the document image 1 is displayed on the screen. That is, the coordinates on the screen are converted into coordinates to be used when processing is performed on the actual data. The execution of the conversion processing in step S717 is described in FIG. 11 (rows 037 to 041, rows 046 to 047, and rows 059 to 060). The processing from S718 to S720 in which the document image is rendered using the image data 2 is described in FIG. 11 (a row 052).

In the rendering processing, the document image 2 generated using the image data 2 retained beforehand in step S711 is rendered on the document image 1 displayed on the screen. Such rendering processing is a key point of the present exemplary embodiment. The trimming processing is performed from coordinates {To 500_x, Top500_y} within the document image 2 as a starting point. The coordinates {Top500_x, Top500_y} within the document image 2 is acquired by reading the document 2 (FIG. 7B) from the coordinates of the point A {Top500_x, Top500_y} on the document image 1 illustrated in FIG. 10A as a starting point, the point A being designated by the operator. (In the example program illustrated in FIG. 11, second and third arguments {Top_X1, Top_Y1} in the row 052 represent a starting point.) With such processing, only a portion indicated by the area 501 illustrated in FIG. 8B is clipped. An ending point of the trimming area can be optionally determined. In the example program illustrated in FIG. 11, fourth and fifth arguments {Width1, Height1} in the row 052 represent the ending point. The ending point may be positioned at an edge of an image. Alternatively, the ending point may be arranged in a fixed position. Accordingly, the trimming area is identified based on the starting point.

As illustrated in FIG. 10B, the trimmed document image 2 (the area 501 illustrated in FIG. 8B) is rendered so as to be arranged below the area 500 on the document image 1. A rendering position can be optionally determined. In the example illustrated in FIG. 10B, a rendering position is arranged below the area 500. In the example program illustrated in FIG. 11, sixth and seventh arguments {Top_X1, Top_Y1+Height1+50} in the row 052 represent a rendering position. Similarly, the processing from steps S721 to S723 in which the document image 3 is rendered using the image data 3 is described in FIG. 11 (a row 053). According to such processing, the entire area of the document image 1, one portion (the area 501) of the document image 2, and one portion (the area 502 illustrated in FIG. 8C) are displayed on the screen as illustrated in FIG. 10B.

In step S724, the operator designates an ending point of the area designation.

In a case where a rectangular area is clipped, the ending point position of the clipping is set to a lower right pixel of the rectangular area.

The operator can execute the processing in step S724 while referring to the display of the area 501 of the document image 2 and the area 502 of the document image 3 in addition to characters in the area 500 of the document image illustrated in FIG. 10B. The document image 1 may be rendered while the area 501 of the document image 2 and the area 502 of the document image 3 may not be rendered. In such a case, the operator designates coordinates of a point B (indicated by an inverted solid triangle mark) in FIG. 10C as an ending point of the area designation.

In the present exemplary embodiment, the document image 1 is rendered, and the area 501 of the document image 2 and the area 502 of the document image 3 are rendered. Accordingly, the operator can designate the ending point of the area designation while checking a width of characters in the area 501 of the document image 2 ({Width501} in FIG. 8B) or a width of characters in the area 502 of the document image 3 ({Width502} in FIG. 8C).

Thus, the operator can designate coordinates of a point C (indicated by an inverted triangle mark) in FIG. 10C as an ending point of area designation based on the area 501 which has the largest width of the character area among the area 500 (Width500), the area 501 (Width501), and the area 502 (Width502).

According to the present exemplary embodiment, therefore, among document images acquired by scanning a plurality of documents, different document images are trimmed and the resultant images are displayed side by side as reference information. This enables the operator to designate an area while considering a size of areas in the different documents.

In the present exemplary embodiment, area designation for OCR is described. However, the present exemplary embodiment is not limited thereto. For example, a nature image such as a photograph may be clipped.

In the present exemplary embodiment, moreover, a starting point of area designation is determined only once. However, a starting point of area designation may be determined a plurality of times. In such a case, rendering of a trimmed image is updated each time the starting point is determined.

Moreover, the present exemplary embodiment has been described using an example in which a character area is an area to be clipped. However, a graphic area may be an area to be clipped instead of the character area.

Hereinafter, a second exemplary embodiment of the present exemplary embodiment is described. In the first exemplary embodiment, a plurality standard format documents is read, and a first document image is rendered to determine a starting point of area designation.

In the first exemplary embodiment, when the starting point of the area is determined, document images of second and subsequent document images are trimmed. Subsequently, the trimmed document images are rendered on the first document image which has been already rendered, so that area designation is performed based on the plurality of trimmed document images.

However, when the image forming apparatus 100 reads a plurality of standard format documents, a position of each document may be displaced. Moreover, in a case where a printing position is displaced within the standard format document, a slight translational movement shift may occur within a sheet. Examples of the positional shift are described with reference to FIGS. 12A, 12B, 12C, and 12D. FIG. 12A illustrates a document without a positional shift. In FIG. 12A, a gray hatching portion is set to an area to be designated. FIG. 12B illustrates a translational movement shift that occurs due to a shift in a reading position or a shift in a printing position. FIG. 12C illustrates a rotational shift that occurs due to mainly a shift in the reading position. FIG. 12D illustrates a scaling shift (a reduction shift in this example) that occurs due to a shift in the printing position. According to the method described in the first exemplary embodiment, such a shift may cause extraction of a portion outside a designated area even though extraction of the same locations (desiccated areas of gray hatching portions) of a plurality of documents is intended.

Figure 13:
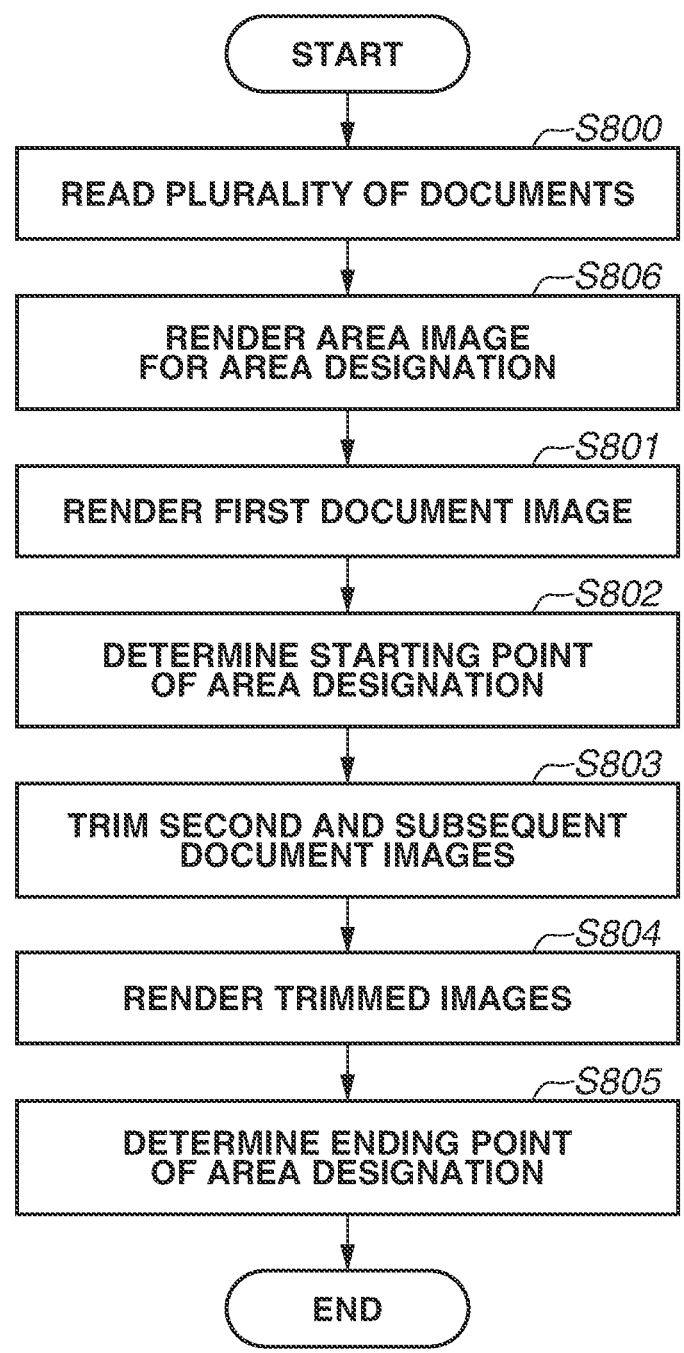
FIG. 13 is a flowchart illustrating processing executed according to the second exemplary embodiment.

Accordingly, as illustrated in FIG. 13, processing for adjusting a position of read image data is added in step S806 to the processing from steps S800 to S805 described above with reference to FIG. 5 in the first exemplary embodiment.

After an image forming apparatus 100 reads a plurality of documents in step S800, image data acquired by, for example, reading a first document among the plurality of documents is set as reference data in a web server 103. Then, image data acquired by reading second and subsequent documents undergoes matching processing to estimate an amount shift, and the shift is corrected by a translational movement.

As for the matching processing, since standard format documents are used, each of the documents has a location that matches among documents. Accordingly, image data in a standard format portion is used for correlation to perform the matching. Through the matching processing, a shift amount can be estimated. If there a translational movement shift, the shift amount is corrected by affine transformation, for example. The position adjustment processing of the read image data in step S806 is not limited to any one method as long as positions of read documents can be adjusted.

The position adjustment processing of the read image data in step S806 enables adjustment of phases of pieces of image data, so that image data having no positional shift can be created. Hence, the processing subsequent to step S801 can be performed.

As for a rotational shift, a scaling shift, and a keystone correction shift in addition to the translational movement shift, the position adjustment processing of read image data in step S806 enables a position of image data to match the first image data. Hence, a correction can be made in consideration of the rotational shift, the scaling shift, and the keystone correction shift.

Therefore, the addition of the position adjustment processing of image data acquired by reading a plurality of documents enables phases of the pieces of image data to match each other, so that area designation can be executed with a document image having no positional shift.

Hereinafter, a third exemplary embodiment of the present invention is described. In the above-described second exemplary embodiment, the position adjustment processing of read image data enables the same coordinates to be selected even if a positional shift occurs in a plurality of images. However, in a case where a shift amount is excessively large, or information necessary to perform matching between images is not present, the position adjustment processing of the image data may fail. In such a case or in a case where there is no position adjustment processing of image data, an actually extracted image cannot be checked until final processing ends.

Figure 14:
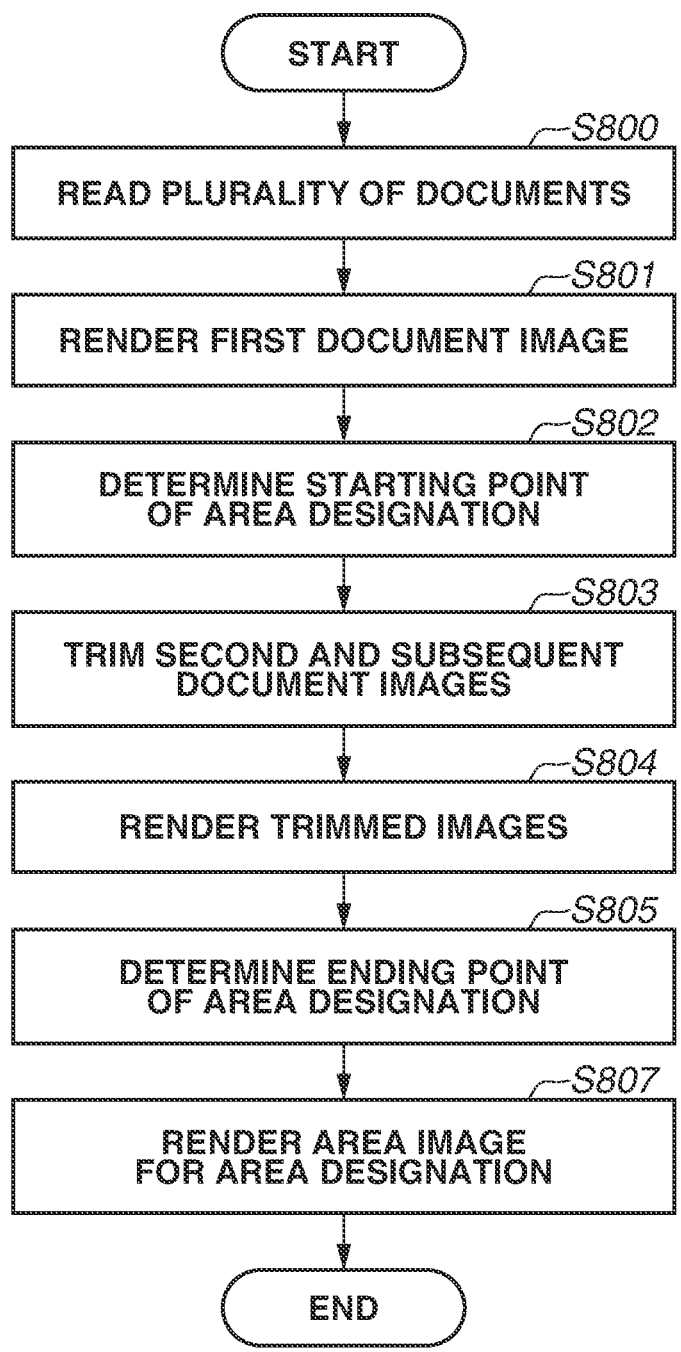
FIG. 14 is a flowchart illustrating processing executed according to a third exemplary embodiment of the present invention.

Accordingly, in the third exemplary embodiment, when an operator determines an ending point, the actually extracted image can be checked or reselected. As illustrated in FIG. 14, processing in step S807 which renders an area image designating the area is added to the processing from steps S800 to S805 described with reference to FIG. 5 in the first exemplary embodiment. In steps from S800 to S805, designation of an area to be extracted is completed. Subsequently, in step S807, a document image actually to be clipped is rendered.

After the coordinate designation is completed in step S805, a value of coordinates on a sheet surface is used to trim a document image generated from the image data. The value of coordinates on the screen is converted into that of coordinates on the sheet in step S717 of FIG. 9. When the trimming processing with respect to a plurality of document images is finished, a trimming processing result is rendered on a screen. The operator checks the rendered document image. This enables the operator to check whether the area has been designated in a correct position. After the check operation, the operator can finish the processing or perform area designation again.

Hereinafter, a fourth exemplary embodiment of the present invention is described. The first exemplary embodiment has been described using an example in which characters to be used for OCR processing is extracted, and a rendering size of second and subsequent document images rendered on a screen remains an original size.

However, when the second and subsequent trimmed images are rendered on the screen, a trimmed image of each of the document images may be large, or the number of documents to be read may be large. In such a case, all trimmed images are not always arranged on the screen. In a case where a trimmed image is too large to be arranged on the screen, it is conceivable that not all of the trimmed images can be rendered.

In the fourth exemplary embodiment, if a trimmed image to be rendered is large or the number of documents to be read is large, a scale of the trimmed image is changed such that the trimmed image is arranged inside the screen. As illustrated in FIG. 15, scaling processing in step S808 which changes a scale of a trimmed image is added to the processing from steps S800 to S805 described with reference to FIG. 5 in the first exemplary embodiment. The processing in step S808 is added between the processing in steps S803 and S804. The term "trimmed image" used herein represents a document image acquired by trimming second and subsequent document images among a plurality of document images of read standard format documents. An example of the trimmed image is illustrated in FIGS. 8B and 8C. In step S803, the second and subsequent document images are trimmed. In step S808, a size in which all document images can be displayed on the screen is calculated based on the number of second and subsequent trimmed document images, resolution, and size including a width and a height of these document images. After the scaling processing is executed based on the calculated size, the processing proceeds to step S804. In step S804, the second and subsequent document images which have undergone the scaling processing and the trimming processing are rendered.

Thus, when the scaling processing of a trimmed image is added, a plurality of trimmed images can be rendered on a screen even if a trimmed image to be rendered is large or the number of documents to be read is large.

As for a trimmed image to be rendered on the screen, not all of images read by the image forming apparatus 100 needs to be rendered. For example, an upper limit may be determined. In such a case, higher images within the upper limit can be used among read images. Alternatively, an attribute may be determined. In such a case, images can be arranged in descending order of the area.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more at the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention not limited to the disclosed exemplary embodiments. The scope of the following claims is to be accorded the broadest interpretation so as to encompass all such modifications and equivalent structures and functions.

This application claims the benefit of Japanese Patent Application No. 2015-080441, filed Apr. 9, 2015, which is hereby incorporated by reference herein in its entirety.

What is claimed is:

1. An image processing apparatus comprising:
   a reading unit configured to read a plurality of documents which is in a common format;
   a display control unit configured to display on a screen a first image acquired by reading of a first document which is among the plurality of documents;
   a receiving unit configured to receive designation of a position in the first image, the position being a starting point for designating a first area in the first image;
   a specifying unit configured to specify, in a second image acquired by reading of a second document which is different from the first document and is among the plurality of documents, a position corresponding to the position designated in the first image; and
   a clipping unit configured to clip the second area from the second image based on the specified position,
   wherein the display control unit displays on the screen the first image and displays, on the displayed first image, the first area and the second area clipped by the clipping unit next to each other.

2. The image processing apparatus according to claim 1, wherein the first area and the second area are a character area.

3. The image processing apparatus according to claim 1, wherein the receiving unit receives designation of another position, the another position being an ending point for designating the first area.

4. The image processing apparatus according to claim 1, further comprising a position adjustment unit configured to adjust a position of an image corresponding to the document read by the reading unit.

5. The image processing apparatus according to claim 1, wherein, when an area of an image clipped based on the position specified by the specifying unit is displayed on the screen, size of the area is changed.

6. The image processing apparatus according to claim 1,
wherein the receiving unit receives designation of another position, the another position being an ending point for designating the first area in the first image, and
wherein an area determined by the designation of the starting point and the designation of the ending point which are received by the receiving unit is extracted from each of images acquired by reading of the plurality of documents.

7. An image processing method, comprising:
reading a plurality of documents which is in a common format;
displaying on a screen a first image acquired by reading of a first document which is among the plurality of documents;
receiving designation of a position in the first image, the position being a starting point for designating a first area in the first image;
specifying, in a second image acquired by reading of a second document which is different from the first document and is among the plurality of documents, a position corresponding to the position designated in the first image; and
clipping the second area from the second image based on the specified position,
wherein the first image is displayed on the screen and, on the displayed first image, the first area and the clipped second area are displayed next to each other.

8. A non-transitory computer-readable storage medium storing a program for causing a computer to execute an image processing method, the image processing method comprising:
reading a plurality of documents which is in a common format, into the computer;
displaying on a screen a first image acquired by reading of a first document which is among the plurality of documents;
receiving designation of a position in the first image, the position being a starting point for designating a first area in the first image;
specifying, in a second image acquired by reading of a second document which is different from the first document and is among the plurality of documents, a position corresponding to the position designated in the first image; and
clipping the second area from the second image based on the specified position,
wherein the first image is displayed on the screen and, on the displayed first image, the first area and the clipped second area are displayed next to each other.

* * * * *